United States Patent
Lee et al.

(10) Patent No.: US 8,750,204 B2
(45) Date of Patent: Jun. 10, 2014

(54) METHOD FOR TRANSMITTING UE-TRIGGERED CHANNEL STATUS INFORMATION

(75) Inventors: Moon Il Lee, Anyang-si (KR); Jae Hoon Chung, Anyang-si (KR); Yeong Hyeon Kwon, Anyang-si (KR); Jin Sam Kwak, Anyang-si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 12/811,205

(22) PCT Filed: Jan. 28, 2009

(86) PCT No.: PCT/KR2009/000399
§ 371 (c)(1), (2), (4) Date: Jun. 29, 2010

(87) PCT Pub. No.: WO2009/096698
PCT Pub. Date: Aug. 6, 2009

(65) Prior Publication Data
US 2010/0296472 A1    Nov. 25, 2010

Related U.S. Application Data

(60) Provisional application No. 61/024,190, filed on Jan. 28, 2008.

(30) Foreign Application Priority Data

Dec. 29, 2008    (KR) ........................ 10-2008-0135510

(51) Int. Cl.
 *H04W 28/16* (2009.01)

(52) U.S. Cl.
USPC ............ 370/328; 370/252; 370/329; 370/437

(58) Field of Classification Search
None
See application file for complete search history.

(56) References Cited

U.S. PATENT DOCUMENTS

| | | | | |
|---|---|---|---|---|
| 7,957,349 B2 * | 6/2011 | Kim et al. | ...................... | 370/331 |
| 8,059,524 B2 * | 11/2011 | Bertrand et al. | .............. | 370/203 |
| 8,111,639 B2 * | 2/2012 | Imamura et al. | .............. | 370/278 |

(Continued)

FOREIGN PATENT DOCUMENTS

| | | |
|---|---|---|
| CN | 1363144 A | 8/2002 |
| WO | WO 2007/073040 A1 | 6/2007 |

(Continued)

OTHER PUBLICATIONS

3GPP TSG-RAN WG2#53, May 8-12, 2006, Shanghai, China, Motorola, LTE Random Access Procedure, R2-061463.

(Continued)

*Primary Examiner* — Jay P Patel
(74) *Attorney, Agent, or Firm* — McKenna Long & Aldridge LLP

(57) ABSTRACT

A method for transmitting a user equipment (UE)-triggered channel status information (CSI) is disclosed. A UE transmits a preamble to an eNode B (eNB) through a random access channel (RACH) or a CSI RACH. The UE receives a response allocating a CSI feedback resource or allocating a resource for negotiation from the eNB. The UE transmits the CSI and a UE ID, or only the CSI to the eNB through a physical uplink shared channel (PUSCH) or a physical uplink control channel (PUCCH).

7 Claims, 7 Drawing Sheets

(56) References Cited

U.S. PATENT DOCUMENTS

| | | | |
|---|---|---|---|
| 8,169,957 B2 * | 5/2012 | Damnjanovic | 370/329 |
| 2005/0083943 A1 | 4/2005 | Lee et al. | |
| 2007/0047498 A1 | 3/2007 | Zhang et al. | |
| 2007/0206531 A1 | 9/2007 | Pajukoski et al. | |
| 2008/0186892 A1 * | 8/2008 | Damnjanovic | 370/311 |
| 2008/0267058 A1 * | 10/2008 | Kolding et al. | 370/208 |
| 2008/0273610 A1 * | 11/2008 | Malladi et al. | 375/260 |
| 2008/0310395 A1 * | 12/2008 | Kashima | 370/350 |
| 2008/0316961 A1 * | 12/2008 | Bertrand et al. | 370/329 |
| 2009/0046573 A1 * | 2/2009 | Damnjanovic | 370/216 |
| 2009/0168718 A1 * | 7/2009 | Wang et al. | 370/330 |
| 2009/0175159 A1 * | 7/2009 | Bertrand et al. | 370/203 |
| 2009/0176525 A1 * | 7/2009 | Wang et al. | 455/522 |
| 2010/0093386 A1 * | 4/2010 | Damnjanovic et al. | 455/522 |
| 2010/0220618 A1 * | 9/2010 | Kwon et al. | 370/252 |
| 2010/0226263 A1 * | 9/2010 | Chun et al. | 370/252 |
| 2010/0238872 A1 * | 9/2010 | Kim et al. | 370/329 |
| 2010/0246499 A1 * | 9/2010 | Kim et al. | 370/329 |
| 2010/0279695 A1 * | 11/2010 | Amirijoo et al. | 455/438 |
| 2010/0309877 A1 * | 12/2010 | Damnjanovic et al. | 370/331 |

FOREIGN PATENT DOCUMENTS

| | | | | |
|---|---|---|---|---|
| WO | WO 2007/078112 | | 7/2007 | |
| WO | WO 2007074841 A1 * | 7/2007 | | H04B 7/005 |
| WO | WO 2007/091815 A2 | | 8/2007 | |
| WO | WO 2007/145273 A1 * | 12/2007 | | H04Q 7/38 |
| WO | WO 2007/148934 A1 | | 12/2007 | |

OTHER PUBLICATIONS

3GPP TSG-RAN WG1 LTE Ad Hoc Meeting, Helsinki, Finland, Jan. 23-25, 2006, NTT DoCoMo, NEC, Sharp, Random Access Transmission in E-UTRA Uplink, R1-060047.

* cited by examiner

METHOD FOR TRANSMITTING UE-TRIGGERED CHANNEL STATUS INFORMATION

This application is a National Stage Entry of International Application no. PCT/KR2009/000399, filed Jan. 28, 2009 and claims priority to U.S. Provisional Application No. 61/024,190 filed Jan. 28, 2008, and Korean Application No: 10-2008-00135510, filed Dec. 29, 2008, all of which are hereby incorporated by reference herein in their entireties.

TECHNICAL FIELD

The present invention relates to a method for transmitting user equipment (UE)-triggered channel status information in a mobile communication system.

BACKGROUND ART

In a packet scheduling based communication system, a first communication station represented by a base station (BS) and a second communication station represented by a UE transmit and receive data through mutual wireless connection. The BS and the UE confirm mutual downlink and uplink channel status and selectively apply any transmission mode, thereby raising the efficiency of the communication system.

In conventional code-division multiple access (CDMA), which is based on packet scheduling, and orthogonal frequency division multiplexing (OFDM), which has been widely considered recently, a method of exchanging channel status of a user to give communication priority to UEs having a good channel status is mainly used. When multiple users are present, a channel status of each user should be recognized as accurately as possible to obtain multi-user diversity. Since OFDM transmits signals using subcarriers, channel variation in frequency as well as channel variation in time should be accurately transmitted to maximize the use efficiency of a frequency channel.

To generate channel information of a user, a method of simply generating average quality of a reception signal over an entire channel bandwidth and coding the quality, or a method of applying differential encoding using correlation with a previous transmission value, may be used.

The digital channel information generated by the aforementioned method is transmitted to a transmitting side. The transmitting side selects a user having a good channel status based on the channel information and generates traffic at a next transmission time interval (TTI). The traffic is modified to transmit values for an entire frequency bandwidth in OFDM, and the values are not expressed as one value for the entire frequency bandwidth but are discriminated in prescribed units of frequency bandwidths. Qualities of reception signals of the discriminated units may be calculated and encoded. Alternatively, differential encoding may be performed using correlation between the qualities or correlation with a previously transmitted value. Thus the generated channel quality information (CQI) or channel state information (CSI) is transmitted to the transmitting side and the transmitting side selects users having a good channel status in a frequency region of the next TTI.

The generated CSI is transmitted from a receiving side to the transmitting side, and a transmission scheme differs according to which side transmission of the CSI start. A general transmission scheme is divided into event-triggered CSI reporting and periodic or on-demand CSI reporting. In event-triggered CSI reporting, a user senses variation in a channel status and transmits CSI to the transmitting side. The periodic CSI reporting serves to transmit CSI of a user through a resource location determined at regular intervals. The on-demand CSI reporting commands the receiving side to transmit CSI at a time point demanded by the transmitting side.

In a conventional event-triggered CSI transmission scheme, CSI reporting is started from a BS to UE. Although in the event-triggered CSI transmission scheme the receiving side needs to feed back CSI according to variation in an initial state of a UE and channel environments, such an operation has yet to be implemented. Furthermore, a control channel can not be used efficiently.

DISCLOSURE

Technical Problem

An object of the present invention devised to solve the problem lies in providing a method for transmitting UE-triggered CSI, which causes a UE to start CSI reporting to a BS as the UE needs to feed back CSI according to variation in an initial state of the UE and channel environments.

Technical Solution

The object of the present invention can be achieved by providing a method for transmitting a UE-triggered CSI, including: (a) transmitting, by a UE, a preamble to an eNode B (eNB) through a random access channel (RACH) or a CSI RACH; (b) receiving a response allocating a CSI feedback resource or allocating a resource for negotiation from the eNB; and (c) transmitting the CSI and a UE identifier (ID), or only the CSI to the eNB through a physical uplink shared channel (PUSCH) or a physical uplink control channel (PUCCH).

In another aspect of the present invention, provided herein is a method for transmitting UE-triggered CSI, including: (a) transmitting, by a UE, scheduling request (SR) information to an eNB through a dedicated RACH; (b) receiving any one response among responses allocating a CSI feedback resource, allocating a resource for negotiation, and allocating a resource sufficient to transmit CSI, from an eNB; and (c) transmitting the CSI to the eNB through a PUSCH or a PUCCH.

Advantageous Effects

The method for transmitting UE-triggered CSI according to the present invention can transmit the CSI to a conventional channel without signal interference when an uplink scheduling request is generated. Moreover, a configurable control signal system can be generated and a control channel can be utilized more effectively.

Further, the method for transmitting UE-triggered CSI can be applied irrespective of a type of sequence used.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
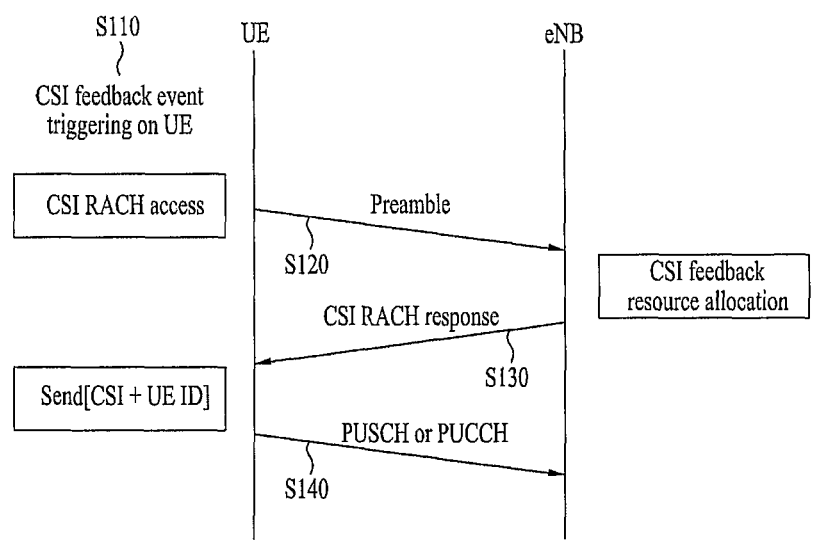
FIG. 1 illustrates an exemplary embodiment of a method for transmitting CSI when a bit space is not sufficient to transmit CSI feedback data through a CSI RACH.

The exemplary embodiments of the present invention will now be described with reference to the accompanying drawings. The detailed description is intended to explain the exemplary embodiments of the present invention, rather than to show the only embodiments that can be implemented according to the invention.

A receiving side may sense an abrupt variation of a channel status while monitoring the channel status of downlink and uplink transmission between a first communication station and a second communication station. If CQI which has been previously transmitted to a transmitting side by the receiving side, a rank necessary for multiple-input multiple-output (MIMO) transmission, precoding matrix index (PMI) information, etc., vary compared with information based on a current channel status, or if such CQI, rank, PMI information, etc. become meaningless for a specific reason, the receiving side should transmit such variations to the transmitting side. To this end, the receiving side may inform the transmitting side of a time point of variation through a random access channel or a predetermined channel. Channels which are usable when the receiving side informs the transmitting side of a time point of variation include a random access channel (ranging channel), a scheduling request channel, etc. The receiving side may transmit the variation through such a channel in the form of a second layer (L2)/a third layer (L3) media access control (MAC) packet.

In the present invention, although a description will be given based on downlink from a BS or eNode B (eNB) (a first communication station) to a UE (a second communication station), the concept of the present invention may be applied even to uplink.

A random access channel (RACH) is generally used to establish synchronization with an eNB but may be employed as a means for allowing a UE to receive resources. To transmit CSI defined as CQI, a rank necessary for MIMO transmission, a PMI, etc., the eNB should allocate a constant amount of resources to the UE. Accordingly, the UE transmits an intention to transmit the CSI to the eNB by accessing the RACH. To this end, an exemplary embodiment of the present invention proposes allocation of the RACH for CSI transmission. If the RACH for CSI transmission is present, the UE, that should update CSI, may access the eNB through a dedicated access channel for transmitting the CSI.

A synchronous or asynchronous RACH may be used for the RACH for CSI allocation. In an exemplary embodiment of the present invention, the synchronous RACH is allocated as the RACH for CSI transmission because there is high probability that the RACH which can be used when the UE reports variation of a channel status to the eNB is a synchronous type. However, the present invention is not limited to a synchronous RACH.

When the UE accesses the eNB through an RACH for CSI, namely, through a CSI RACH, the UE may transmit CSI thereof together with the RACH. If the CSI RACH transmits only an event indicating a resource request simply for CQI feedback transmission, the eNB should additionally allocate a resource for transmitting an identifier (ID) of the UE together with a sufficient amount of resources when allocating resources for CSI transmission as a response to the resource request.

FIG. 1 illustrates an exemplary embodiment of a method for transmitting CSI when a bit space is not sufficient to transmit with CSI feedback data through a CSI RACH.

Specifically, FIG. 1 illustrates a two-step CSI transmission method including a UE informing an eNB of a CSI transmission purpose through an RACH and then transmitting CSI through a physical uplink shared channel (PUSCH) or a physical uplink control channel (PUCCH), when a bit space is insufficient to transmit with CSI feedback data through a CSI RACH.

Referring to FIG. 1, a UE may generate an event for CSI transmission in step S110. When such a CSI feedback event is triggered by the UE, the UE transmits a preamble to an eNB through a CSI RACH in step S120. Then the eNB transmits a CSI RACH response to the UE by allocating a CSI feedback resource in step S130. Next, the UE transmits both CSI and UE ID to the eNB through a PUSCH (Physical Uplink Shared Channel) or PUCCH (Physical Uplink Control Channel) in step S140. The PUCCH transmits uplink control information. In this case, information cannot be transmitted simultaneously through both the PUCCH and the PUSCH from the same UE.

If the bit space of the CSI RACH is sufficient, unlike FIG. 1, at least one of a CSI value and the UE ID may be transmitted together with the RACH preamble in step S110 for transmission of the RACH.

Namely, if the UE can transmit data in addition to the RACH preamble while accessing the RACH, the UE may immediately inform the eNB of the CSI as data information. However, if the UE should transmit only access sequence information during RACH transmission, the UE informs the eNB of the CSI in a message transmission step subsequent to RACH transmission.

Meanwhile, if the CSI RACH is not allocated, the UE may first inform the eNB only of start of CSI transmission through any RACH according to another exemplary embodiment of the present invention. That is, the UE informs the eNB of access through any RACH and may inform the eNB that the access is for CSI transmission in a negotiation process of the RACH. If the eNB senses that the access is for CSI transmission, the eNB allocates a resource according to the transmission amount of CSI. The UE may transmit the amount of CSI to the eNB in the negotiation process or by being included in a data part of the RACH.

If the UE accesses the eNB using the RACH, the eNB may not recognize, in some cases, which UE is accessing the eNB. Accordingly, the CSI should have a rule which can indicate that information is about a specific UE. To this end, the eNB should be able to decode, together with the CSI, UE information (temporal or permanent UE ID in a physical layer, or UE ID in MAC). Accordingly, a method which can confirm the UE ID may be considered, instead of simply encoding and then transmitting a CSI value while the UE transmits the CSI.

That is, the UE ID may be masked to CSI digital bits (i.e., XOR operation) or may be set to be included in the CSI before CSI encoding. If the eNB previously knows ID information of the UE transmitting the CSI, masking of the UE ID to the CSI value may be effective. However, if the eNB does not know the ID information of the UE transmitting the CSI, the UE may encode the UE ID together with the CSI and then transmit to eNB so that the eNB can read out the UE ID during decoding of a signal.

Figure 2:
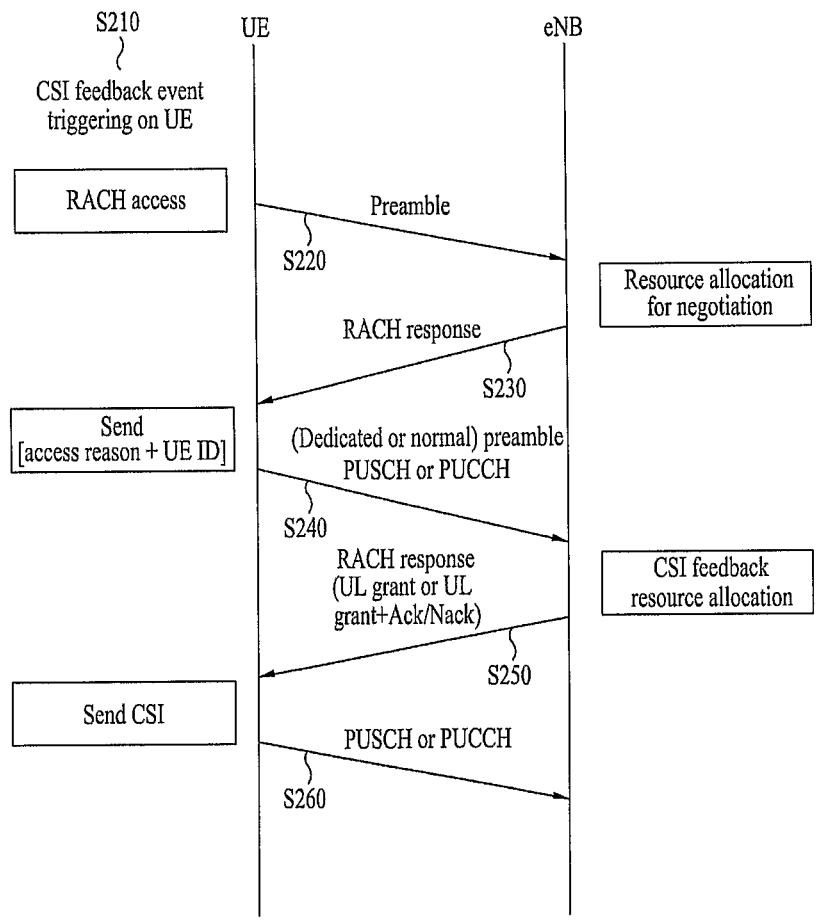
FIG. 2 illustrates an exemplary embodiment of a method for transmitting CSI when data cannot be transmitted through a normal RACH.

FIG. 2 illustrates an exemplary embodiment of a method for transmitting CSI when data cannot be transmitted through a normal RACH.

Referring to FIG. 2, a UE may generate an event for CSI transmission in step S210. When such a CSI feedback event is triggered by the UE, the UE transmits a preamble to an eNB through a normal RACH in step S220. The UE receives an RACH response allocating resources for negotiation from the eNB in step S230. The UE transmits a (dedicated or common) preamble including an RACH access reason and a UE ID to the eNB through a PUSCH or a PUCCH in step S240. Then the UE receives, from the eNB, an RACH response allocating a CSI feedback resource including uplink (UL) grant, or UL grant, and acknowledgment/negative acknowledgment (Ack/Nack) in step S250. Next, the UE transmits CSI to the eNB through the PUSCH or the PUCCH in step S260.

Meanwhile, if the UE triggers CSI transmission using a normal RACH and can transmit an RACH access reason in addition to the normal RACH, the UE may indicate that initial RACH transmission is for CSI transmission.

Figure 3:
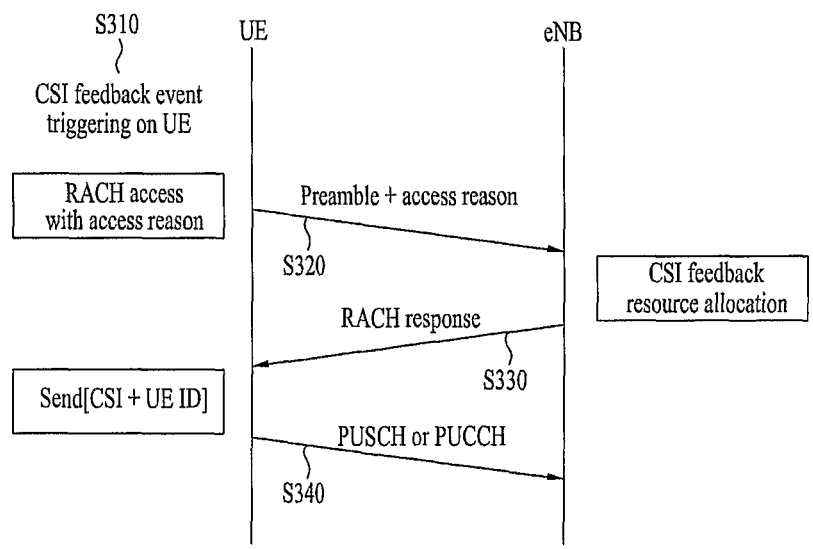
FIG. 3 illustrates an exemplary embodiment of a method for transmitting CSI when data can be transmitted through an RACH.

FIG. 3 illustrates an exemplary embodiment of a method for transmitting CSI when data can be transmitted through an RACH.

Referring to FIG. 3, a UE may generate an event for CSI transmission in step S310. When such a CSI feedback event is triggered by the UE, the UE transmits a preamble to an eNB through an RACH and simultaneously transmits an RACH access reason indicating that a corresponding RACH access reason is for CSI transmission in step S320. Even though a normal RACH is used, if the UE informs the eNB that the access reason is for CSI transmission, the eNB can allocate resources to the UE so that the UE can transmit CSI. Accordingly, the UE can immediately receive an RACH response allocating a CSI feedback resource from the eNB in step S330 after the UE transmit the preamble to the eNB. Next, the UE transmits CSI and a UE ID to the eNB through a PUSCH or PUCCH in step S340.

Hereinafter, a method for the UE to transmit the CSI and UE ID to the eNB through the PUSCH or PUCCH will be described.

Figure 4A:
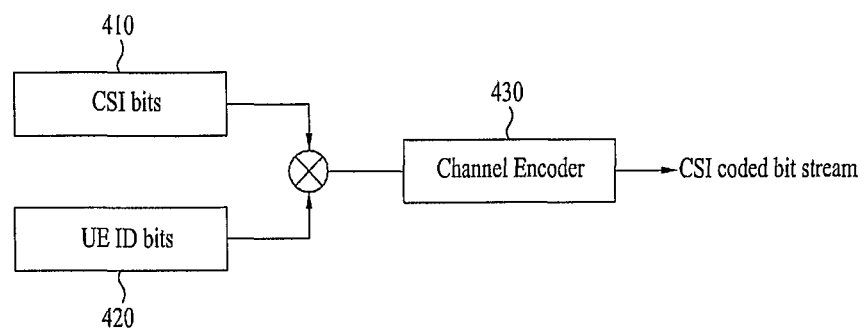
FIGS. 4a and 4b illustrate exemplary embodiments of a method for masking CSI bits and UE ID bits and then transmitting CSI.
Figure 4B:
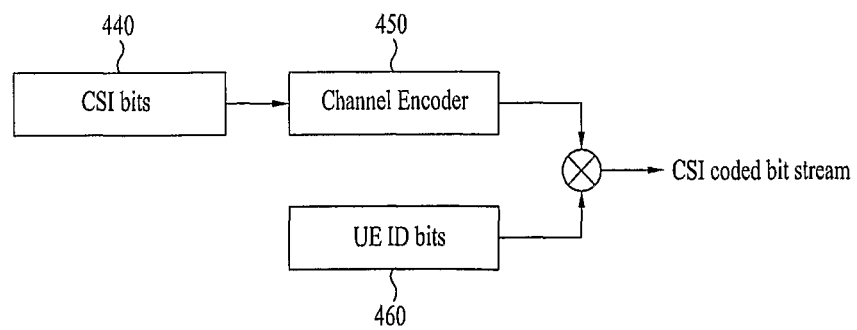

FIGS. 4a and 4b illustrate exemplary embodiments of a method for masking CSI bits and UE ID bits and then transmitting CSI.

Referring to FIG. 4a, a UE directly masks UE ID bits 420 to CSI source bits 410, channel-encodes the masked bits through a channel encoder 430, and transmits CSI to an eNB in the form of a CSI coded bit stream.

Referring to FIG. 4b, a UE channel-encodes CSI bits 440 through a channel encoder 450. In more detail, the UE converts the CSI digital bits into another digital or analog sequence so that a receiving side can strongly decode the CSI bits. Next, the UE masks UE ID bits 460 to the channel-encoded CSI bits to generate a CSI coded bit stream. The UE may transmit CSI in the form of the bit stream to an eNB. If the length of the UE ID bits is longer than the length of the CSI bits, only a part of the UE ID bits, for example, the same length from a most significant bit (MSB) or a least significant bit (LSB) of the UE ID bits is masked. If the length of the UE ID is shorter than the length of the CSI bits, the UE sequentially applies the UE ID bits from the MSB or LSB.

As another exemplary embodiment of the present invention, if the UE includes a scheduling request (SR) channel for resource allocation, the UE may start CSI transmission to the eNB using the SR channel. Although the UE may use a channel, which can be used independently, simply to send arbitrary information of scheduling request, the UE may transmit additional information through such a channel. If the UE can transmit additional information through the SR channel, CSI, control channel information (Ack/Nack, handover, etc.) and UE status information (buffer status, priority, etc.) may be further transmitted. Thus, if the UE transmits the CSI to the eNB through a dedicated channel, a method of indicating the CSI through multiple steps and a method of indicating the CSI while transmitting an initial scheduling request may be used.

The following Table 1 illustrates an SR transmission type. A format of SR transmission may be divided as follows.

TABLE 1

| | Non-coherent Transmission | Coherent Transmission |
| --- | --- | --- |
| SR only | Existence of signal indicates SR | Signal always exist together with BPSK modulation for SR |
| SR and additional information | SR detection by existence of signal Additional information from modulation information | SR and additional information form modulation symbols on SR channel |

If the SR channel is constructed to transmit only the SR, only one bit indicating whether the SR is present is permitted to be transmitted through the SR channel. Accordingly, the UE first transmits one-bit information for the SR in order to feed back UE-triggered CSI. Next, when the UE negotiates a reason for the SR with the eNB, the UE may transmit the CQI by informing the eNB that the reason is CSI transmission. A CSI feedback method of the UE may be configured by two or three steps according to a response type of the eNB to the SR. Namely, if the eNB allocates an initial resource sufficient to transmit the CSI, the UE immediately transmits the CSI to the eNB through a PUSCH or PUCCH at a preset time point by two-step CSI transmission. However, if an additional process between the eNB and the UE is required for a step of transmitting and receiving a reason for SR or buffer status reporting, that is, if resources insufficient to transmit the CSI are allocated, a third step is needed.

Hereinafter, a UE-triggered CSI feedback method through an SR will be described in detail.

Figure 5:
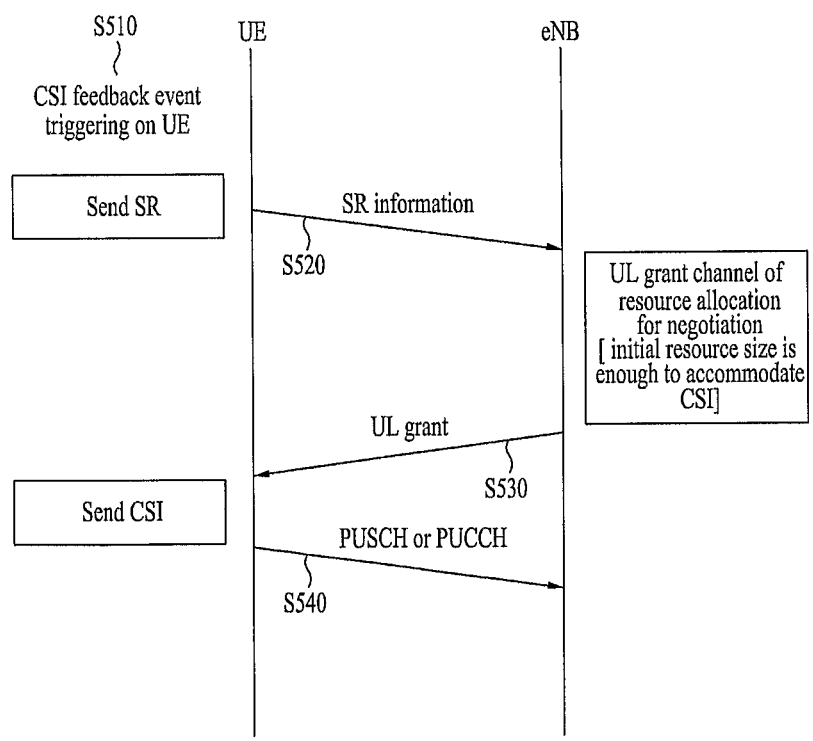
FIG. 5 illustrates an exemplary embodiment of a method for transmitting CSI through two steps by a UE-triggered CSI feedback method through an SR.
Figure 6:
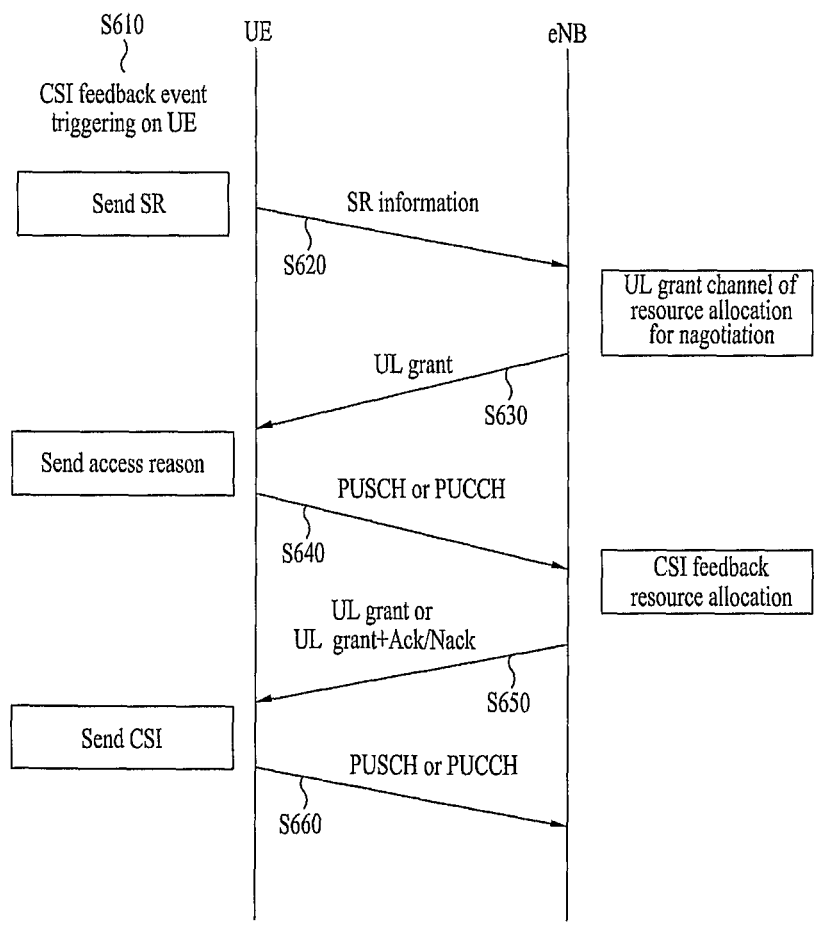
FIG. 6 illustrates an exemplary embodiment of a method for transmitting CSI through three steps by a UE-triggered CSI feedback method through an SR.

FIGS. 5 and 6 illustrate exemplary embodiments of a method for transmitting CSI through two and three steps by a UE-triggered CSI feedback method through an SR.

Referring to FIG. 5, a UE may generate an event for CSI transmission in step S510. If such a CSI feedback event is triggered by the UE, the UE may transmits SR information to an eNB in step S520. The eNB may transmit UL grant to the UE through an uplink grant channel (UL-GCH) of resource allocation for negotiation in step S530. In this case, the eNB allocates an initial resource sufficient to transmit CSI. The UE may transmits the CSI to the eNB through a PUSCH or a PUCCH in step S540. At this time, bit indication indicating that information transmitted by the UE is the CSI should also be transmitted. In more detail, a format should be included for determining whether the information transmitted by the UE is CSI or is buffer size negotiation or an indication reason. As described above, the UE may transmit the CSI to the eNB through two steps.

Referring to 6, a UE may generate an event for CSI transmission in step S610. If such a CSI feedback event is triggered by the UE, the UE may transmit SR information to an eNB in step S620. The eNB may transmit UL grant to the UE through a UL-GCH of resource allocation for negotiation in step S630. The UE may transmit an access reason to the eNB through a PUSCH or a PUCCH in step S640. The eNB may transmit UL grant, or transmits UL grant and Ack/Nack to the UE by allocating a CSI feedback resource in step S650. Next, the UE transmits CSI to the eNB through the PUSCH or PUCCH in step S660. Thus, the UE may transmit the CSI through three steps.

As another exemplary embodiment of the present invention, if an SR channel is constructed to transmit an SR and additional information, the UE can adjust the amount of resources which should be allocated by the eNB by transmitting the additional information to the eNB. Namely, through additional information bits, it is possible to directly indicate that the SR is for CSI or to indicate a method for using bits so that only the amount of a buffer can be adjusted. If the CSI is indicated as one-bit information or an option among various combinations, the eNB allocates the amount of resources which can transmit the CSI. As another method, indication for the amount of resource allocation may be performed by direct bit indication so that the eNB may allocate sufficient resources to transmit the CSI.

When transmitting the SR and the additional information, the number of additional information bits may be one or two. The following Table 2 shows mapping of a method for indicating the CQI and a processing method by only a buffer size, when the number of additional information bits is one or two.

TABLE 2

| Additional bit | CSI Indication | Indirect Indication |
|---|---|---|
| One bit | State: data or CSI | State: resource allocation or multiple negotiation |
| Two bits | State: data, CQI, rank, or PMI | State: resource allocation, multiple negotiation, rank, or PMI |
| | Bit 1: buffer size | Bit 1: buffer size |
| | Bit 2: CQI or not (data) | Bit 2: rank or PMI |

In Table 2, if the additional bit is one bit, the one additional bit is bit indication indicating the CSI, or bit indication indicating the amount of resource allocation or multiple negotiations as indirect indication.

Figure 7:
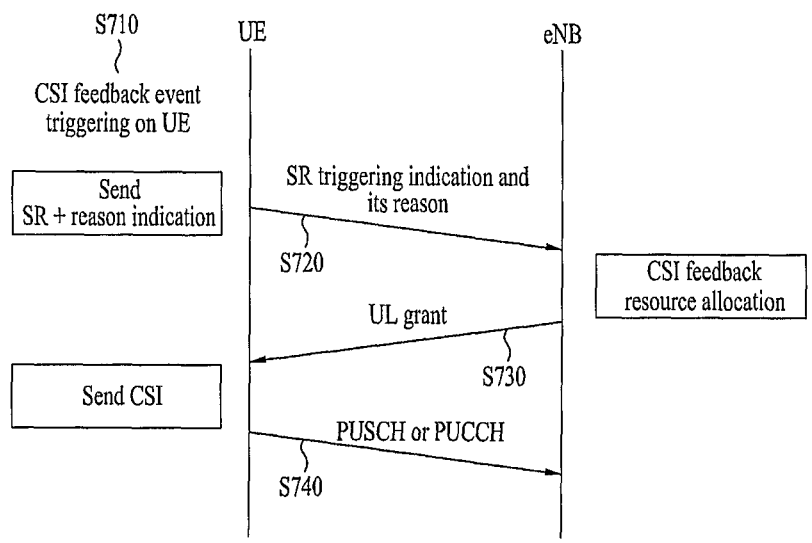
FIG. 7 illustrates an exemplary embodiment of a method for transmitting CSI through two steps by transmitting a reason to an eNB.

FIG. 7 illustrates an exemplary embodiment of a method for transmitting CSI by informing an eNB of CQI through additional information.

Referring to FIG. 7, a UE may generate an event for CSI transmission in step S710. If such a CSI feedback event is triggered by the UE, the UE may transmit SR triggering indication and a reason thereof to an eNB in step S720. The UE receives UL grant allocating a CSI feedback resource from the eNB in step S730. The UE then transmits CSI to the eNB through a PUSCH or a PUCCH in step S740.

As another exemplary embodiment of the present invention, if a dedicated CSI channel is allocated to the UE performing periodic CSI reporting, the UE may transmit the CSI to the eNB through the dedicated CSI channel. Namely, resources for CSI transmission are allocated to the UE at an arbitrary time and this resource allocation is performed by the eNB. In this case, the UE may or may not transmit the CSI to the eNB at the arbitrary time. However, since the eNB determines that the UE transmits the CSI using the allocated resources, if the UE does not transmit the CSI, it is not necessary to detect information such as CQI, a rank related to MIMO transmission, a PMI, etc. To reduce radiation power at a time point when the UE does not transmit the CSI to the eNB, if the UE transmits a simple signal (e.g., single tone or time burst on reserved resources) which does not include the CSI, the eNB may not decode the dedicated CSI channel. Therefore, even if the UE can control CSI transmission, the eNB should always allocate a corresponding resource to the UE.

The UE constructs and feeds back intended CSI with respect to an event-triggering CSI feedback using a PUSCH constructed by an existing eNB at any time point or a periodic CSI feedback using a PUCCH. The UE may trigger the CSI feedback due to variation in a channel status or an initial state of the UE. The UE needs to inform the eNB that the UE-triggered CSI feedback is transmitted through uplink. Accordingly, the UE may transmit CSI feedback indication information to the eNB through an uplink prior to any time point of CSI feedback.

In a further exemplary embodiment of the present invention, a channel for transmitting the CSI feedback indication information includes a dedicated SR channel or a dedicated synchronous RACH. If the UE transmits the CSI feedback indication information through the dedicated SR channel, an SR information bit space of an existing unique SR channel can be extended based on extension of a modulation order. Alternatively, synchronous and asynchronous detection may be combined, or a part of symbols of the SR channel and any one of two Walsh covers may be used, to extend the bit space.

Meanwhile, as another exemplary embodiment of the present invention, if the UE transmits the CSI feedback indication information through the dedicated synchronous RACH, a step for transmitting the CSI feedback indication information may be added or replaced in the transmission steps shown in FIGS. 1 to 3.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The present invention provides a method for transmitting UE-triggered CSI, which can efficiently use a control channel. The present invention is widely applicable to a mobile communication system.

The invention claimed is:

1. A method of transmitting user equipment (UE)-triggered channel state information (CSI) from a UE in a wireless communication system, the method comprising:
transmitting a random access message including a preamble and access reason through a random access channel (RACH) or a CSI RACH to an eNode B (eNB) when a CSI transmission event is trigged by the UE,
wherein the access reason indicates a request for a resource for a CSI transmission;
receiving a random access response message including information regarding the resource allocated for the CSI transmission from the eNB in response to the transmission of the preamble and access reason of the random access message; and encoding CSI and UE identifier (UE ID) by channel-encoding after masking UE identifier (UE ID) bits to CSI bits, or masking the UE ID bits to channel-encoded CSI bits; and transmitting the encoded CSI and UE ID through the allocated resource to the eNB, wherein the encoded CSI and UE ID are transmitted through a physical uplink shared channel (PUSCH) or a physical uplink control channel (PUCCH) of the allocated resource.

2. The method according to claim 1, wherein when masking the UE ID bits to channel-encoded CSI bits, if a length of the UE ID bits is longer than a length of the CSI bits, most significant bits (MSBs) or least significant bits (LSBs) corresponding to a part of the UE ID bits are masked to the channel-encoded CSI bits.

3. A method of transmitting user equipment (UE)-triggered channel state information (CSI) from a user equipment (UE), the method comprising:

transmitting a first message including a scheduling request (SR) triggering indication and reason of the SR triggering indication through a SR channel to an eNode B (eNB) when a CSI transmission event is trigged by the UE, wherein the reason of the SR triggering indication indicates a request for a resource for a CSI transmission;

receiving a second message including information regarding the resource allocated for the CSI transmission from the eNB in response to the transmission of the reason of the SR triggering indication and SR triggering indication of the first message;

encoding CSI and UE identifier (UE ID) by channel-encoding after masking UE identifier (UE ID) bits to CSI bits, or by masking the UE ID bits to channel-encoded CSI bits; and transmitting the encoded CSI and UE ID through the allocated resource to the eNB, wherein the encoded CSI and UE ID are transmitted through a physical uplink shared channel (PUSCH) or a physical uplink control channel (PUCCH) of the allocated resource.

4. The method according to claim 3, wherein the first message further includes information regarding a buffer status of the UE.

5. A method for receiving user equipment (UE)-triggered channel state information (CSI) at an eNode B (eNB) in a wireless communication system, the method comprising:

receiving a random access message including a preamble and access reason through a random access channel (RACH) or a CSI RACH from the UE when a CSI transmission event is trigged by the UE, wherein the access reason indicates a request for a resource for a CSI transmission, transmitting a random access response message including information regarding resource allocated for the CSI transmission, to the UE in response to the reception of the preamble and access reason of the random access message; and receiving, the CSI and an identifier (ID) of the UE through the allocated resource, from the UE;

wherein the received CSI and UE ID were encoded by channel-encoding after masking UE identifier (UE ID) bits to CSI bits, or after masking the UE ID bits to channel-encoded CSI bits, and wherein the encoded CSI and UE ID are received through a physical uplink shared channel (PUSCH) or a physical uplink control channel (PUCCH) of the allocated resource.

6. A method of receiving user equipment (UE)-triggered channel state information (CSI) at an eNode B (eNB), the method comprising:

receiving a first message including a scheduling request (SR) triggering indication and reason of the SR triggering indication through a SR channel, from a UE when a CSI transmission event is trigged by the UE, wherein the reason of the SR triggering indication indicates a request for a resource for a CSI transmission;

transmitting a second message including information regarding resource allocated for the CSI transmission to the UE in response to the reception of the reason of the SR triggering indication and the SR triggering indication of the first message;

receiving the CSI through the allocated resource from the UE, wherein the received CSI was encoded by channel-encoding after masking UE identifier (UE ID) bits to CSI bits, or after masking the UE ID bits to channel-encoded CSI bits, and wherein the CSI is received through a physical uplink shared channel (PUSCH) or a physical uplink control channel (PUCCH) of the allocated resource.

7. The method according to claim 6, wherein the first message further includes information regarding a buffer status of the UE.

* * * * *